United States Patent
Busse-Grawitz et al.

(10) Patent No.: US 8,561,306 B2
(45) Date of Patent: Oct. 22, 2013

(54) KIT FOR AN ELECTRIC MOTOR HAVING A ROTARY ENCODER

(75) Inventors: Max Erick Busse-Grawitz, Alpnach Dorf (CH); Florian Schmidt, Emmenbrücke (CH); Berthold Puszta, Luzern (CH); Reto Korner, Sempach (CH); Mario Lussmann, Sarnen (CH); Bruno Unternährer, Horas (CH)

(73) Assignee: Maxon Motor AG, Sachseln (CH)

( * ) Notice: Subject to any disclaimer, the term of this patent is extended or adjusted under 35 U.S.C. 154(b) by 251 days.

(21) Appl. No.: 13/140,246

(22) PCT Filed: Dec. 15, 2009

(86) PCT No.: PCT/EP2009/008993
§ 371 (c)(1),
(2), (4) Date: Aug. 19, 2011

(87) PCT Pub. No.: WO2010/072359
PCT Pub. Date: Jul. 1, 2010

(65) Prior Publication Data
US 2011/0296698 A1 Dec. 8, 2011

(30) Foreign Application Priority Data
Dec. 16, 2008 (DE) .......................... 10 2008 062 561

(51) Int. Cl.
*G01B 21/22* (2006.01)
*B29C 45/14* (2006.01)

(52) U.S. Cl.
USPC ..................................... 33/1 PT; 264/272.11

(58) Field of Classification Search
USPC ..................................... 33/1 PT; 264/272.11
See application file for complete search history.

(56) References Cited

U.S. PATENT DOCUMENTS 4,625,411 A * 12/1986 Kashiwagi et al. ........... 33/1 PT
4,794,250 A  12/1988 Togami
(Continued)

FOREIGN PATENT DOCUMENTS

EP  0 280 390 A1  8/1988
JP  2002-357457 A  12/2002

OTHER PUBLICATIONS

International Search Report (PCT/ISA/210) issued on Apr. 29, 2010, by European Patent Office as the International Searching Authority for International Application No. PCT/EP2009/008993.

(Continued)

*Primary Examiner* — Christopher Fulton
(74) *Attorney, Agent, or Firm* — Buchanan Ingersoll & Rooney PC

(57) ABSTRACT

The present invention relates to a kit for an electric motor having a rotary encoder for determining the position of the motor shaft of the electric motor. A kit is proposed by which simple and precise positioning of a sensor of the rotary encoder on the electric motor, good protection of the sensor, and simple assembly are possible. To this end, the invention proposes that the kit includes an electric motor and a rotary encoder having a solid measure and having a sensor having sensor electronics, wherein the solid measure of the rotary encoder can be applied to a motor shaft at a reverse end face of the electric motor and protruding therefrom, the sensor of the rotary encoder is embedded with the sensor electronics in a plastic disc, a motor-side mounting element is disposed at the reverse end face of the electric motor, and the plastic disc comprises a sensor-side mounting element designed to be complementary to the motor-side mounting element.

20 Claims, 10 Drawing Sheets

(56) References Cited

U.S. PATENT DOCUMENTS

Figure 1:
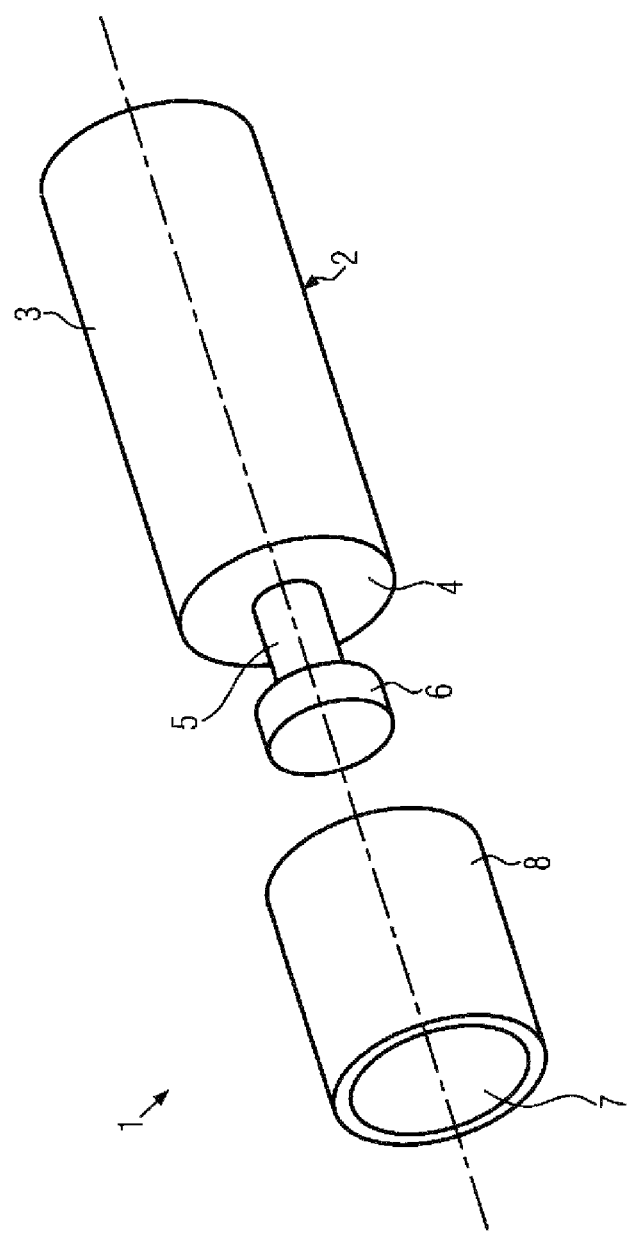

| | | | |
|---|---|---|---|
| 6,144,625 A * | 11/2000 | Kuroda et al. | 369/44.27 |
| 6,568,092 B1 * | 5/2003 | Brien | 33/1 PT |
| 6,688,006 B2 * | 2/2004 | Itomi | 33/1 N |
| 7,316,071 B2 * | 1/2008 | Harrer | 33/1 PT |
| 7,392,588 B2 * | 7/2008 | Brandl | 33/1 PT |
| 7,398,699 B2 * | 7/2008 | Itomi | 73/862.08 |
| 7,406,772 B2 * | 8/2008 | Siraky | 33/1 PT |
| 7,774,945 B2 * | 8/2010 | Sano | 33/1 PT |
| 2007/0146171 A1 | 6/2007 | Igarashi et al. | |
| 2008/0111061 A1 | 5/2008 | Wong et al. | |

OTHER PUBLICATIONS

International Preliminary Report on Patentability (PCT/IPEA/409) issued on Feb. 22, 2011, by European Patent Office as the International Searching Authority for International Application No. PCT/EP2009/008993.

* cited by examiner

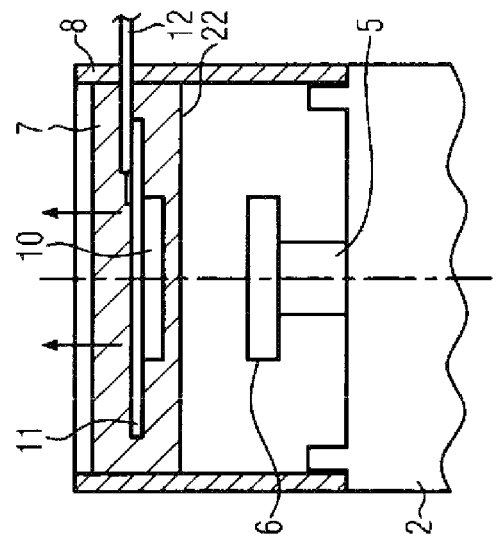
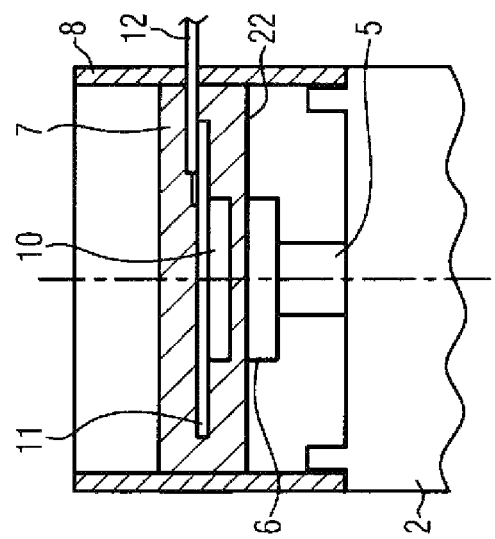
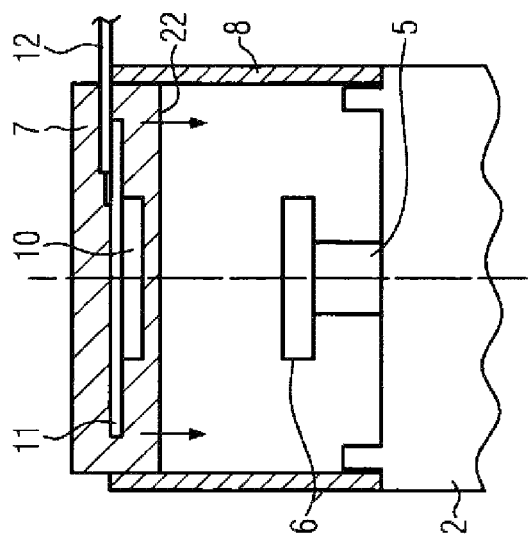

KIT FOR AN ELECTRIC MOTOR HAVING A ROTARY ENCODER

The present invention relates to a kit for an electric motor having a rotary encoder for determining the position of a motor shaft of the electric motor.

It is known to provide electric motors with rotary encoders to determine the position of the motor shaft of the electric motor. Typically, such a rotary encoder comprises a sensor and a solid measure which are fixed to the motor shaft. A rotation of the motor shaft, and thus of the solid measure, is registered by the sensor and outputted in the form of electric signals. To this end, the most different variants of rotary encoders are used, e.g. capacitive rotary encoders, inductive rotary encoders, magnetoresistive rotary encoders, optical rotary encoders, magnetic rotary encoders or potentiometric rotary encoders. The rotary encoders can directly be installed in the motor. To this end, each motor diameter and each type of rotary encoder requires a different rotary encoder casing and a correspondingly adapted attachment on the electric motor. The correct position of the sensor is very important, depending on the technology of the rotary encoder. Typically, the correct position of the sensor is predetermined by the shape of the rotary encoder casing. Therefore, the sensor has to fit into the casing of the rotary encoder and is substantially referenced by its outer contour. For this reason, the milling of the outer contours has to be very precise and is expensive. Also, it is known to secure rotary encoders on the motor by means of pins. Disadvantages are here the high costs for metal pins and an insufficient stability of plastic pins.

EP 280 390 A1 already describes a small-power electric motor with an encoder module mounted thereon. The encoder module comprises a code disc, both sides of which are partially encompassed by an emitter module/detector module. The code disc and the emitter module/detector module are disposed in an encoder casing, which is comprised of a cover and a bottom plate. The cover can simply be clipped onto the bottom plate. The bottom plate is provided with bores so that it can be fixed to an end face of the electric motor by means of fixing screws.

JP 2002-357457 likewise discloses a small-power electric motor with an encoder mounted thereon. The code disc of the encoder is fitted onto the motor shaft of the electric motor. The emitter module/detector module of the encoder is located on a fixing plate which includes a recess. The fixing plate is laterally inserted between the electric motor and the code disc, so that the emitter module/detector module partially encompasses the code disc on two sides. Moreover, a cover is provided which is fitted onto the electric motor once the encoder has been mounted on the electric motor.

The mounting of these encoders on the electric motors is relatively complicated.

Therefore, it is the object of the present invention to provide a kit for an electric motor having a rotary encoder, which allows an easy and precise positioning of the sensor of the rotary encoder on the electric motor, a good protection of the sensor and an easy assembly.

To this end, it is proposed by the invention that the kit comprises an electric motor and a rotary encoder having a solid measure and having a sensor with a sensor electronics, wherein the solid measure of the rotary encoder can be mounted on the motor shaft emerging from the electric motor at a rear end face of the electric motor, the sensor and the associated sensor electronics of the rotary encoder are embedded in a plastic disc, a motor-side fixing member is disposed at the rear end face of the electric motor, and the plastic disc comprises a sensor-side fixing member designed to be complementary with the motor-side fixing member.

This means that the solid measure of the rotary encoder is mounted at an end face of the electric motor on the motor shaft emerging therefrom. By means of the motor-side fixing member disposed at this end face and the sensor-side fixing member disposed on the plastic disc, the plastic disc, and thus the sensor of the rotary encoder, is fixed at that place to the electric motor where the motor shaft emerges from the electric motor. Thus, the sensor is mounted adjacent to the solid measure. By the motor-side fixing member and sensor-side fixing member of the plastic disc a standardized connection is realized between the electric motor and the rotary encoder regardless of the motor type and rotary encoder type. This means that the position of the sensor of the rotary encoder is predefined by the two fixing members, so that a good positioning accuracy between the solid measure and the sensor is possible both in the axial and the radial direction relative to the longitudinal axis of the motor shaft. By embedding it into the plastic disc the sensitive sensor with the associated sensor electronics is protected, for instance, from the effects of an impact.

In one embodiment it may be provided that one of the two fixing members is sleeve-shaped and that the other fixing member has a complementary shape, so that the fixing members can be inserted into each other. The sleeve-shaped fixing member thus forms a receptacle for the second fixing member, so that a very simple attachment of the two fixing members relative to each other is possible. The fixing members merely have to be inserted into each other.

Preferably, it may be provided that the sleeve-shaped fixing member forms a cylindrical receptacle for the other fixing member, which is formed as a cylindrical shaft. As a rule, the casing of the electric motor is cylindrical, so that a very simple configuration of the fixing members is possible.

In another advantageous embodiment it may be provided that the motor-side fixing member is formed as a cylindrical bore or as a cylindrical shaft on the motor casing and that the plastic disc with the sensor embedded therein is cylindrical and is at least partially formed as a sensor-side fixing member with a cylindrical shaft or with a cylindrical bore. In this case, the sensor-side fixing member is therefore formed by the plastic disc itself. If the motor-side fixing member is formed as a cylindrical bore, the plastic disc is formed as a cylindrical shaft or cylindrical disc and can simply be inserted into the cylindrical bore of the motor casing. Preferably, the motor casing includes to this end a circular ring-shaped projection, into which the plastic disc can be inserted. If the motor-side fixing member is formed as a cylindrical shaft, however, the plastic disc comprises at least partially a cylindrical bore and can be fitted onto the motor casing of the electric motor to encompass the motor-side fixing member formed as a cylindrical shaft. In this case, too, the fixing member on the motor is preferably formed as a circular ring-shaped projection. On the plastic disc, too, a circular ring-shaped projection is provided, whose inner diameter corresponds to the outer diameter of the circular-ring-shaped projection on the motor casing. The motor-side fixing member on the motor casing and the plastic disc forming the sensor-side fixing member are preferably chosen with respect to their dimensions such that the fixture for the rotary encoder has maximally the diameter of the electric motor casing.

It may also be provided, however, that the sensor-side fixing member is formed as a sleeve mounted on the plastic disc. In this case, a very easy production of the plastic disc is possible, which is then formed as a circular cylindrical disc. The separate sleeve is mounted on the plastic disc, and the plastic disc is mounted on the fixing member of the motor casing by means of the sleeve. In this way, an easy attachment of the sleeve on the electric motor is possible, a simple and faster assembly of the kit is realized.

According to another modification it may be provided that the sensor with the associated sensor electronics is coated with a plastic material so as to form the plastic disc. In this way, a very easy production of the plastic disc with the embedded sensor is possible. During the injection molding a good positioning of the sensor in the injection mold is possible, so that the necessary accuracy for positioning the sensor is obtained.

Moreover, it can be provided that the plastic disc is provided with a protection against electromagnetic interference fields. Thus, the sensor is protected against electric and magnetic external influences, so that the measured values are not falsified.

In order to allow a simple production it may be provided that the protection against electromagnetic interference fields is realized by an electrically highly conductive lacquer coat applied to the plastic disc and/or electrically conductive fillers incorporated in the plastic disc and/or insert parts having a shielding effect mounted on the plastic disc.

In yet another modification it is proposed that the plastic disc with the sensor and the sensor electronics embedded therein is displaceable in the sleeve in order to adjust an optimum distance between the solid measure and the sensor. This allows an easy assembly of the kit, with a good positioning accuracy in the axial direction between the sensor and the solid measure of the rotary encoder. The solid measure is placed on the motor shaft of the electric motor so as to adopt its intended position. The sleeve with the plastic disc inserted in the same is fitted onto the motor. Then, the plastic disc is pushed inwards until it abuts on the solid measure. The plastic disc is now pulled outwardly again until the optimum axial distance between the sensor and the solid measure is obtained.

In order to allow a simple realization and an easy evaluation of the sensor signals it may be provided that the sensor electronics is connected to a cable and that a strain relief for the cable is provided in the plastic disc.

In yet another preferred embodiment it is provided that the sensor with the associated sensor electronics is mounted on a printed circuit board and that the printed circuit board comprises electrical connectors for the electric motor. The electrical connectors serve, for instance, as connectors for the motor winding of an electric motor. In the case of a direct current electric motor the connectors may also serve as contacts for the commutation brushes. Thus, the power supply of the motor is realized by the power supply of the printed circuit board, an easy power connection of the electric motor is possible.

Preferably, it may be provided that electrical contact elements are disposed on the printed circuit board or on the motor winding, which form the electrical connectors for the electric motor. This renders the power supply of the electric motor particularly easy. If the plastic disc with the printed circuit board embedded therein is fixed to the electric motor by means of the fixing members the electrical contact elements, e.g. pins, come in contact with the power supply unit of the printed circuit board and the connectors of the electric motor. This ensures the power supply of the electric motor.

In another embodiment of the invention it is provided that the plastic disc is inserted into the casing of the electric motor in the area of the rear end face, wherein the casing forms the motor-side fixing member and the plastic disc forms the sensor-side fixing member. Separate protection is sought for this embodiment. The advantage of this embodiment is that the plastic disc with the sensor of the rotary encoder is integrated in the casing of the electric motor and is thus well protected. Moreover, this embodiment results in an extremely compact construction.

Advantageously, it may be provided that the plastic disc forms a bearing seat for the motor shaft of the electric motor. This measure, too, allows an extremely compact construction of the electric motor.

Usefully, it may be provided that the plastic disc with the sensor embedded therein and the associated sensor electronics is disposed between the rotor and the solid measure on the motor shaft. This allows a good bearing of the motor shaft and a very compact structure of the electric motor.

The invention further relates to an electric motor formed of an above-described kit, which comprises a rotary encoder having a sensor with an associated sensor electronics embedded in a plastic disc and having a solid measure, wherein the plastic disc is inserted into a casing of the electric motor and forms a bearing seat for a motor shaft of the electric motor. As was described above, this construction of the electric motor allows an extremely compact structure.

Moreover, the invention also relates to a method for producing a plastic disc with a sensor including an associated sensor electronics of a rotary encoder embedded therein and disposed on a printed circuit board for an electric motor kit by means of injection molding.

The respective object is to provide a method that allows an easy production of the plastic disc.

According to the invention it is provided to this end that the printed circuit board with the sensor is introduced into an injection mold and that the printed circuit board with the sensor is coated with a plastic material, wherein the printed circuit board with the sensor mounted thereon is positioned in the injection mold such that the position of the sensor in the plastic disc is defined with respect to the outer dimensions of the plastic disc.

By this, a very good positioning accuracy of the sensor is obtained with respect to the outer dimensions of the plastic disc. This means that in each plastic disc the sensors are disposed at a precisely defined position, which is chosen with respect to the position at which the solid measure of the rotary encoder is fixed to the electric motor. The plastic disc is fixed to the electric motor by means of its outer circumference, so that a very exact alignment of the solid measure and the sensor of the rotary encoder is achieved.

In one modification of the method it may be provided that pins are provided in the injection mold which engage in bores in the printed circuit board, thereby defining the position of the sensor in the plastic disc. In this way an easy positioning of the sensor in the injection mold is possible.

Another very simple modification of the method provides that a cavity is provided in the injection mold, into which the sensor is placed and thus positioned.

It may also be provided, however, that the printed circuit boards are fixed in the injection mold by a lead frame, thereby positioning the sensor. In this case, the lead frame may also form the electrical connectors for the windings of the electric motor.

Alternatively, it could also be provided that the printed circuit board with the sensor is placed onto a pre-coated element of the plastic disc and is completely encapsulated.

This allows a complete closure of the plastic disc, so that a particularly good protection of the sensor is achieved.

Figure 2A:
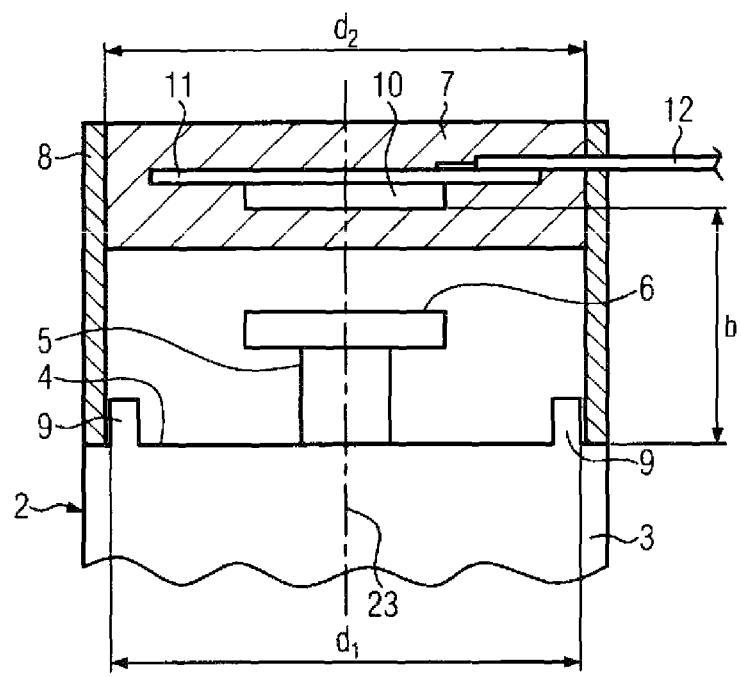
Figure 2B:
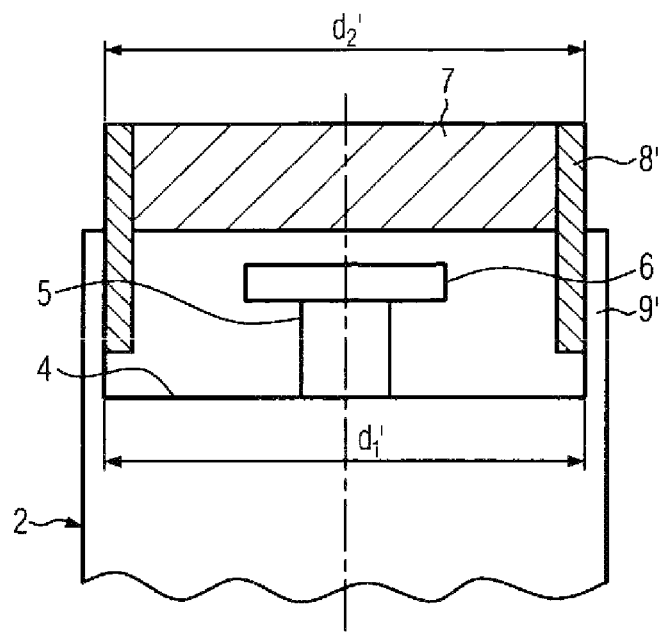
Figure 2C:
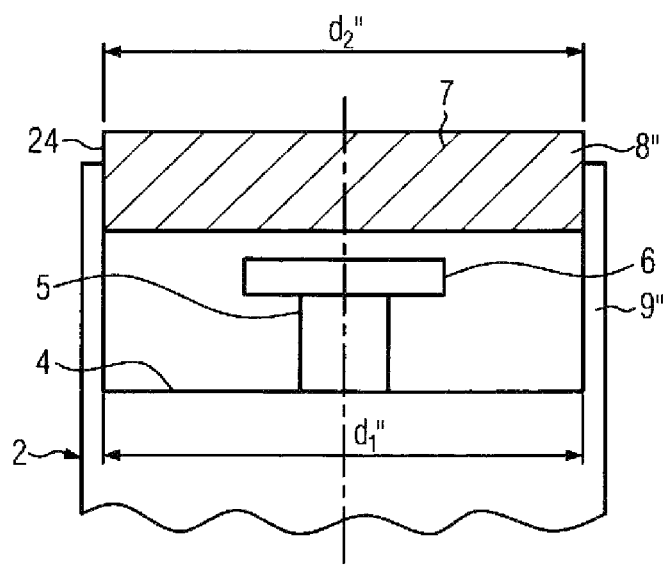
Figure 2D:
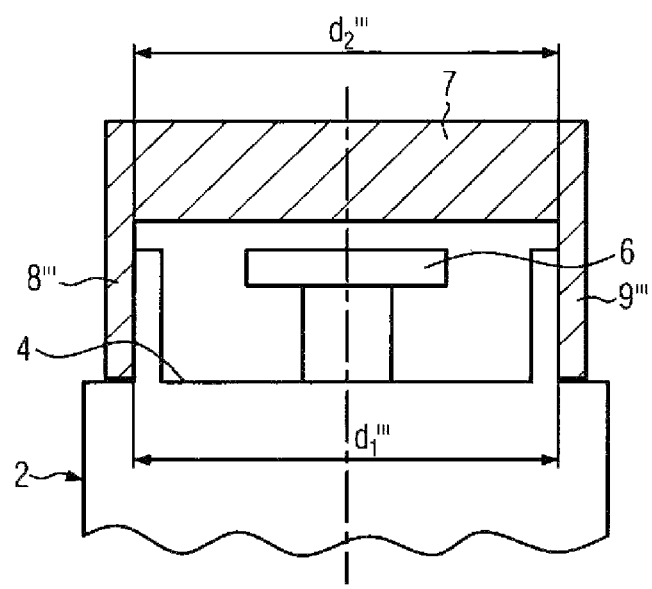
Figure 3A:
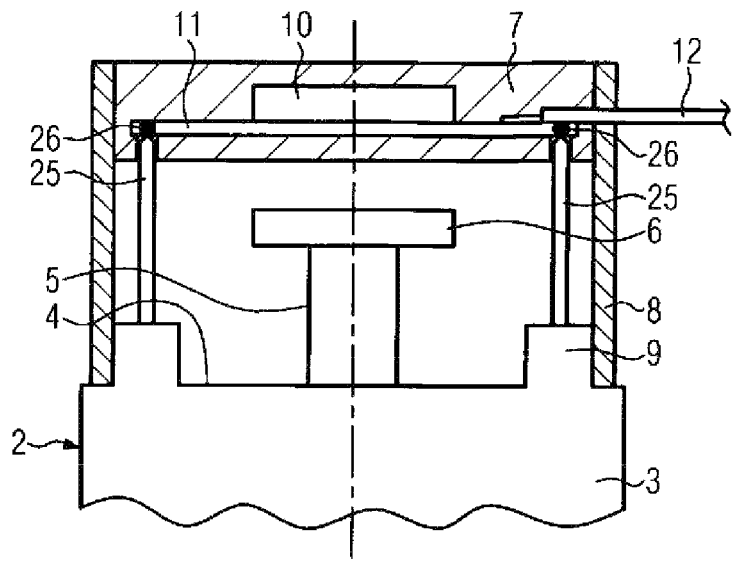
Figure 3B:
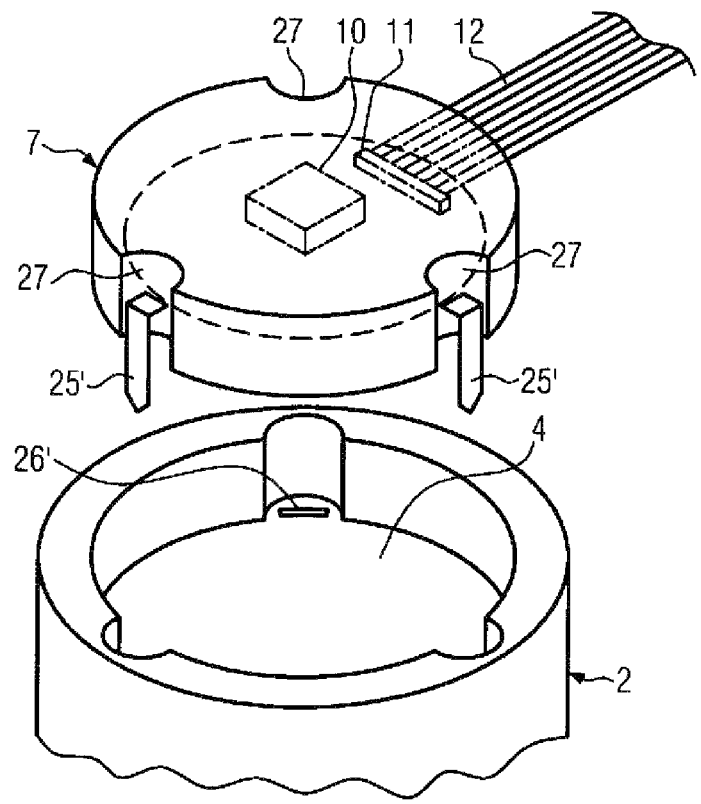
Figure 4A:
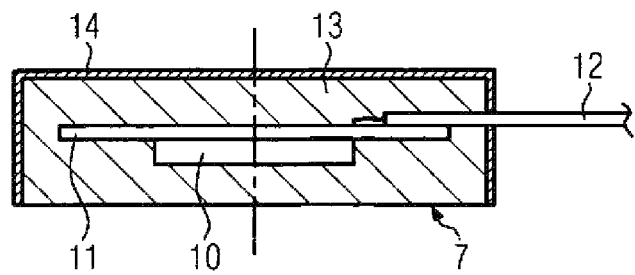
Figure 4B:
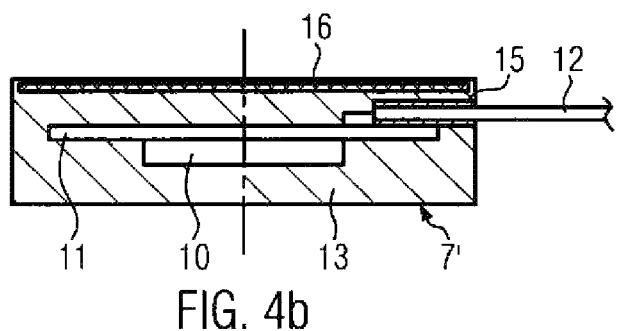
Figure 4C:
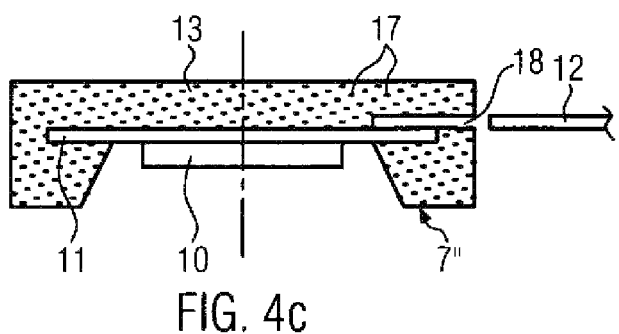
Figure 4D:
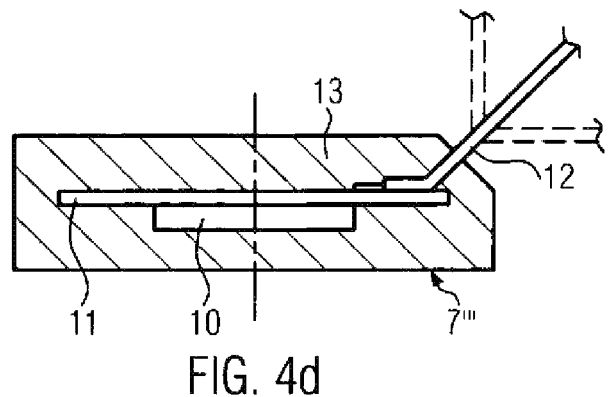
Figure 4E:
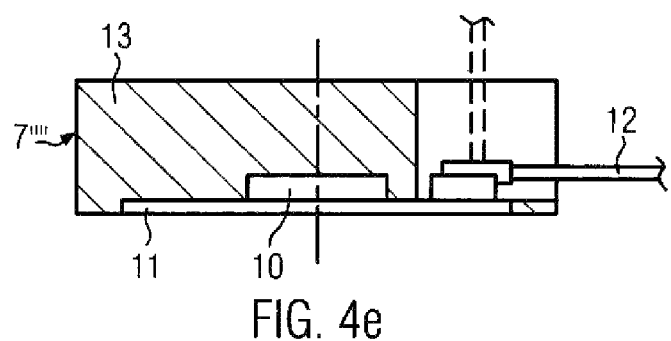
Figure 4F:
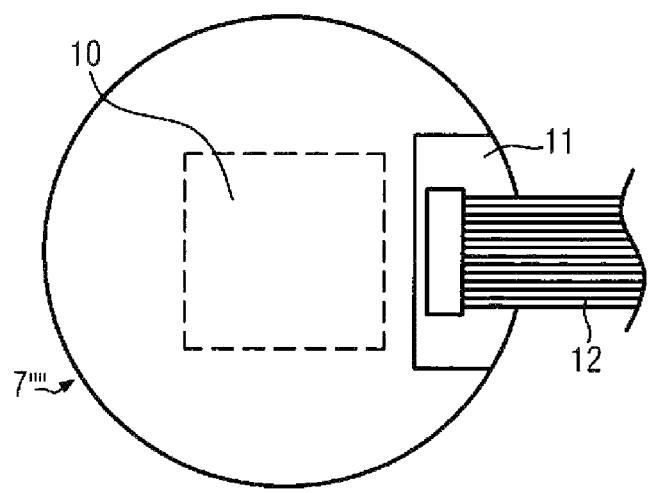
Figure 5A:
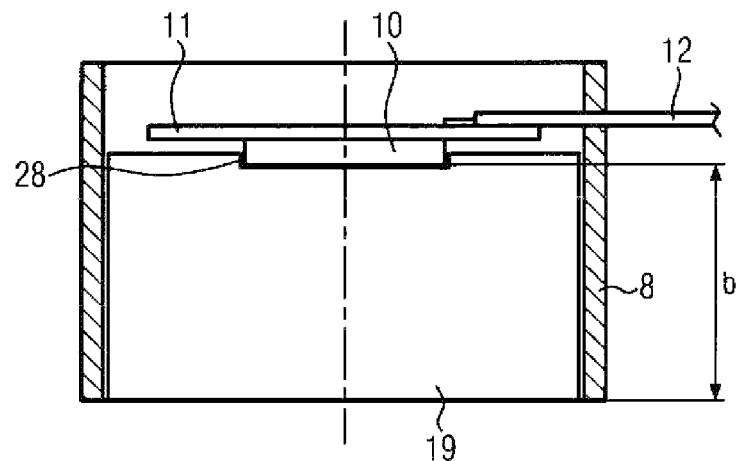
Figure 5B:
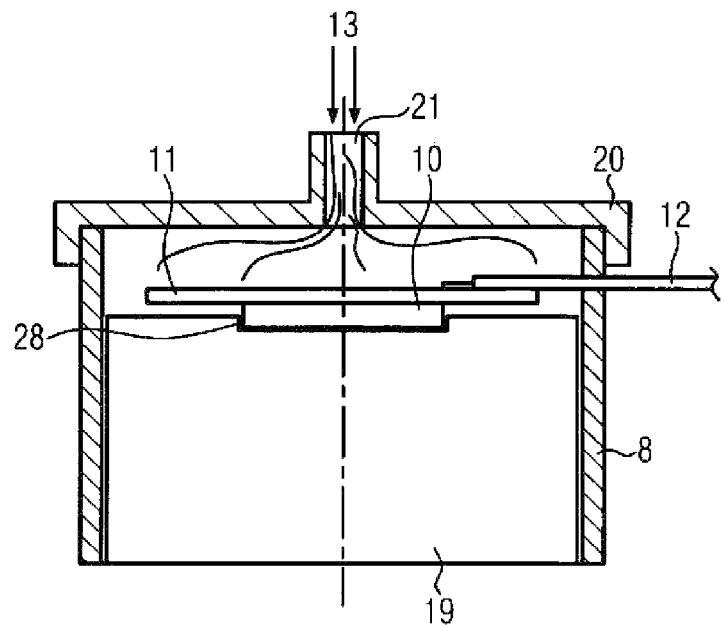
Figure 7:
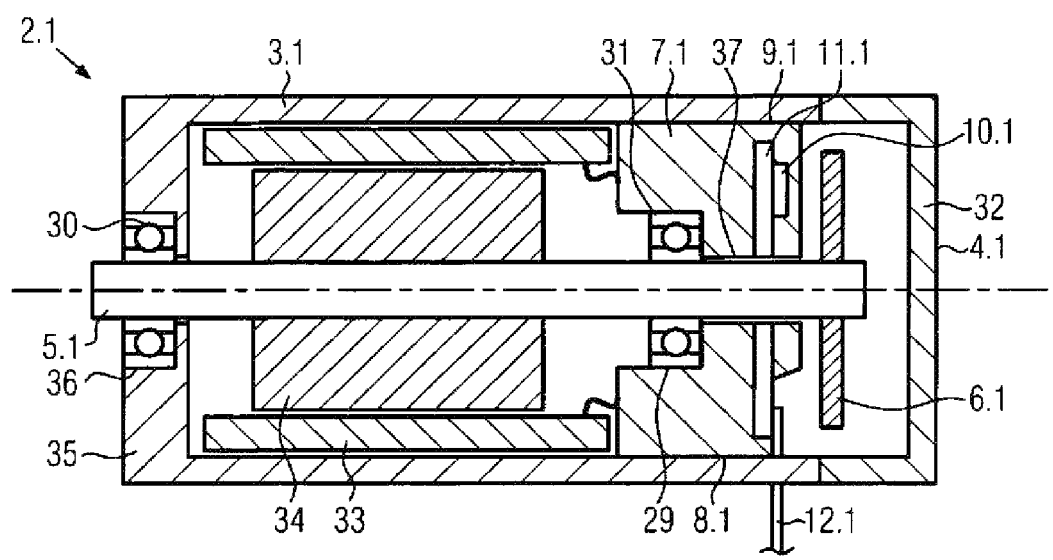

Embodiments of the invention shall be explained in more detail below by means of drawings. In the drawings:

FIG. 1 shows an exploded view of the kit,

FIG. 2a-2d show a partial section of the rear end face of the electric motor with the plastic disc mounted thereon in different embodiments, FIG. 3a-3b show different embodiments of the motor contacts, FIG. 4a-4f show different embodiments of the plastic disc with the sensor embedded therein, FIG. 5a-5b show coating the sensor and the sensor electronics with a plastic material, FIG. 6a-6c show inserting the plastic disc into the sleeve, and FIG. 7 shows other embodiments of an electric motor.

FIG. 1 shows an exploded view of a kit 1 for an electric motor 2 with a rotary encoder for determining the position of the motor shaft 5 of the electric motor 2. The kit 1 comprises an electric motor 2, which preferably has a cylindrical casing 3. At a rear end face 4 of the casing 3 the motor shaft 5 of the electric motor 2 emerges from the casing 3.

The kit 1 further comprises a solid measure 6 of the rotary encoder. In the assembled state of the kit 1 the solid measure 6 is fixed to a defined position on the motor shaft 5 of the electric motor 2.

The rotary encoder of the kit 1 further comprises a sensor with an associated sensor electronics, which are embedded in a plastic disc 7. The plastic disc 7 is provided with a sensor-side fixing member 8 at its end facing the electric motor 2. This sensor-side fixing member 8 can be mounted, preferably fitted onto a motor-side fixing member (not shown in FIG. 1). The sensor-side fixing member 8 and the motor-side fixing member then form a standardized interface between the electric motor 2 and the sensor of the rotary encoder disposed in the plastic disc 7. The two fixing members are realized such that any type of sensor can be mounted on any type of motor. The fixing members can be inserted into each other and can additionally be connected with each other by gluing, calking, welding etc.

FIG. 2a shows a partial section through the rear end of the electric motor 2 with the plastic disc 7 mounted thereon. The casing 3 of the electric motor 2 is provided with a motor-side fixing member 9 at the rear end face 4 at which the motor shaft 5 emerges from the casing 3. The sensor-side fixing member 8 associated with the plastic disc 7 has a complementary shape with respect to the motor-side fixing member 9. Thus, the two fixing members 8, 9 complement each other and together form the attachment of the plastic disc 7 with the sensor 10 of the rotary encoder on the electric motor 2. Preferably, either the sensor-side fixing member 8 or the motor-side fixing member 9 is sleeve-shaped, and the respective other fixing member 9; 8 has a complementary shape, that is, preferably in the fashion of a pin, which is insertable into the sleeve. Thus, the fixing members 8, 9 can be inserted into each other, which allows an easy attachment. Preferably, that one of the two fixing members 8, 9 that is sleeve-shaped has a cylindrical shape, thus forming a cylindrical receptacle for the respective other/second fixing member 9; 8. The other/second fixing member 9; 8 is then formed as a cylindrical shaft and can simply be inserted into the sleeve. As was already described above, the stability of this connection can be enhanced by gluing, calking, welding etc.

In the embodiment shown in FIG. 2a the motor-side fixing member 9 is formed as a circular ring-shaped projection at the end face of the electric motor 2. The circular ring-shaped projection encompasses the motor shaft 5 with the solid measure 6 provided thereon. The sensor-side fixing member 8 is formed by a hollow cylindrical sleeve 8 fitted onto the plastic disc 7. The sleeve 8 can be fixedly connected to the plastic disc 7. It is also conceivable, however, that the plastic disc 7 is disposed to be movable in the sleeve 8. The outer diameter $d_1$ of the motor-side fixing member 9, which is formed as a circular ring-shaped projection, and the inner diameter $d_2$ of the sensor-side fixing member 8, i.e. of the sleeve, are adapted to each other so that the sleeve 8 can be easily fitted onto and retained on the circular ring-shaped projection 9. This means that the sleeve 8, and thus the plastic disc 7, is retained in a defined position at the rear end face 4 of the electric motor 2.

The sensor 10 of the rotary encoder as well as the sensor electronics of the sensor 10 mounted on a printed circuit board 11 are embedded in the plastic disc 7. The sensor electronics is connected to a cable 12 which transmits the sensor signals to a controller and ensures the power supply. The sensor cable 12 is likewise embedded in the plastic disc 7. The embedding is accomplished such that a strain relief for the cable 12 is provided. The sensor cable 12 is preferably a flat ribbon cable. The use of a round cable or individual strands, respectively, is possible as well. The printed circuit board 11 on which the sensor 10 and the sensor electronics is disposed is embedded in the plastic disc 7 to adopt a defined position with respect to the outer dimensions of the plastic disc 7. Thus, the position of the sensor 10 is defined by the outer dimensions of the plastic disc 7. Thus, the position of the sensor 10 relative to the electric motor 2 is defined by the inner diameter $d_2$ of the sensor-side fixing member 8 and the outer diameter $d_1$ of the motor-side fixing member 9. This position is chosen such that the sensor 10 and the solid measure 6 disposed on the motor shaft 5 of the electric motor 2 are optimally aligned with respect to each other in the radial direction relative to the longitudinal axis 23 of the electric motor 2 and the radial offset between the sensor 10 and solid measure 6 is kept at a minimum. Thus, a high accuracy of the rotary encoder is possible. The axial distance relative to the longitudinal axis 23 between the sensor 10 and the solid measure 6, too, is adjusted by the sensor-side fixing member 8 and the motor-side fixing member 9. The shape of the two fixing members 8, 9 is standardized, so that any rotary encoder may be mounted on any electric motor. This allows a great multitude of possible combinations between different types of motors and types of rotary encoders.

Thus, the motor-side fixing member 9 and the sensor-side fixing member 8 are configured such that they can be inserted into each other and fixed to each other according to the joining principle shaft/bore. The stability of this connection can be enhanced by gluing, welding, calking etc. In the embodiment example shown in FIG. 2a the sensor-side fixing member 8, i.e. the sleeve fitted onto the plastic disc 7, forms the bore into which the motor-side fixing member 9, which is formed as a circular ring-shaped projection, can be inserted as shaft.

FIG. 2b shows another embodiment example of the two fixing members. The plastic disc 7 is only illustrated schematically; the sensor and the printed circuit board are not illustrated. Below, only the differences will be explained. In this embodiment example, too, the sensor-side fixing member 8' is a separate sleeve into which the plastic disc 7 is introduced. The motor-side fixing member 9', again, is formed as a circular ring-shaped projection at the rear end face 4 of the electric motor 2. The outer diameter $d_2'$ of the sensor-side fixing member 8', i.e. of the sleeve, is slightly smaller than the inner diameter $d_1'$ of the motor-side fixing member 9'. This means that, in this case, the sensor-side fixing member 8' is introduced into the motor-side fixing member 9', so that the motor-side fixing member 9' forms the bore and the sensor-side fixing member 8' forms the shaft introduced into the bore.

Yet another embodiment of the fixing members is shown in FIG. 2c. Here, too, only the differences over the above-described embodiments will be explained. In the embodiment example shown in FIG. 2c the sensor-side fixing member is formed by the plastic disc 7 itself. The plastic disc 7 is cylindrical, so that the circumferential surface 24 of the cylindrical plastic disc 7 forms the sensor-side fixing member 8''' and is introduced as shaft into the motor-side fixing member 9''. Again, the motor-side fixing member 9'' is formed as a circular ring-shaped projection at the end face 4 of the electric motor 2 and forms a bore for receiving the shaft formed by the plastic disc 7. The inner diameter $d_1''$ of the motor-side fixing member 9'' is slightly larger than the outer diameter $d_2''$ of the cylindrical plastic disc 7, so that the plastic disc 7 can be easily introduced into and retained in the motor-side fixing member 9''.

FIG. 2d shows another embodiment example of the fixing members. In this case, too, only the differences over the above-described embodiments will be explained. Again, the motor-side fixing member 9''' is formed at the rear end face 4 of the electric motor 2 and has the shape of a circular ring-shaped projection. At the side of the plastic disc 7 facing the electric motor 2, too, a circular ring-shaped projection 8''' is formed, which forms the sensor-side fixing member. The inner diameter $d_2'''$ of the circular ring-shaped projection 8''' on the plastic disc 7 is slightly larger than the outer diameter $d_1'''$ of the circular ring-shaped projection 9''' on the electric motor 2, so that these projections are pushed into each other, thereby retaining the plastic disc 7 on the electric motor 2. This means that in this embodiment example the sensor-side fixing member 8''' forms the bore into which the motor-side fixing member 9'' is introduced as shaft.

As can be seen in FIGS. 2a to 2d, the plastic disc 7 with the sensor-side fixing member 8, 8', 8'', 8''' is preferably designed such that its outer diameter maximally corresponds to the outer diameter of the electric motor 2.

FIG. 3a shows yet another embodiment of the electric motor 2 with the rotary encoder fixed thereto. The motor shaft 5 emerges from the electric motor 2 at the rear end face 4 of the electric motor 2. The solid measure 6 of the rotary encoder is mounted on the motor shaft 5. The motor-side fixing member 9 is formed as a circular ring-shaped projection at the end face 4 of the electric motor 2. In this circular ring-shaped projection 9 electrical contact elements, e.g. pins 25, are disposed, which are connected to the electric motor 2 and form motor connectors. These motor connectors may form connectors for the motor winding of the electric motor. In the case of a direct current motor the motor connectors serve as contacts for the commutation brushes. In the plastic disc 7 recesses or bores are provided at places assigned to the pins 25, so that the pins 25 can be passed to the printed circuit board 11, where they are connected at electrical connection points 26 to electrical terminals of the printed circuit board 11. Thus, the electric motor can be connected via the electrical connectors 26 and the pins 25, which are formed as motor contacts, to a power supply unit.

In the embodiment shown in FIG. 3a the sensor 10 of the rotary encoder is located on the upper side of the printed circuit board 11 and is thus disposed at the side of the plastic disc 7 facing away from the electric motor 2. This arrangement of the sensor is also possible in all other described embodiments of the kit for the electric motor. Basically, also any other position of the sensor on the printed circuit board is possible, however.

Another embodiment of the electrical contact elements is shown in FIG. 3b. In this embodiment, the pins 25' forming the motor contacts and connecting the electric motor 2 to a power supply unit, e.g. in the form of a cable 12, are mounted on the circuit board 11 of the sensor 10. To this end, the plastic disc 7 is provided with recesses 27 in the edge region thereof, at which the pins 25' project out of the plastic disc 7, e.g. in the form of lead frames, are bent downwardly and are mounted on suitable counter-contacts 26'. The pins 25' can be joined with the counter-contacts 26', for instance, by inserting, welding or the like. In FIG. 3b the sensor-side fixing member and the motor-side fixing member are formed such that a circular ring-shaped projection projects upwardly at the end face 4 of the electric motor 2 and the plastic disc 7 is introduced into and retained in this circular ring-shaped projection.

It could also be provided that areas of the printed circuit board project laterally out of the plastic disc, i.e. on the circumferential surface, to form contacts. The motor lines can, for instance, be welded to these contacts.

FIG. 4a show a sectional view of an embodiment of a plastic disc 7. The printed circuit board 11 with the sensor 10 mounted thereon and the associated sensor electronics of a rotary encoder are embedded in the plastic disc 7. The printed circuit board 11 is connected by means of a cable 12 to a controller for the power supply and for transmitting the sensor signals of the sensor 10. Preferably, the cable 12 is realized as a flat ribbon cable. Preferably, the printed circuit board 11 with the sensor 10 mounted thereon, the sensor electronics and the cable 12 is coated with a plastic material 13 so as to form the plastic disc 7. The cable 12 is here directly coated with the plastic material 13 of the plastic disc 7 so as to obtain a strain relief. For instance, thermosetting plastics, two-component casting resins, partially polymerized single-component resins, e.g. Macromelt™, or also thermoplastics are used as plastic material. In order to obtain a protection of the sensor 10 and the associated sensor electronics against electric and magnetic interference fields the plastic disc 7 is at least partially coated with a coating of an electrically highly conductive lacquer 14. Thus, the plastic disc 7 forms a casing for the sensor 10 and the associated sensor electronics of the rotary encoder. By means of this casing the electronics is protected from environmental influences, e.g. humidity, heat or impacts. The electronic components and the sensor 10 are thus well protected.

FIG. 4b shows another embodiment of a plastic disc 7'. In the following, only the differences will be explained. Again, the printed circuit board 11 with the sensor 10 mounted thereon and the associated sensor electronics as well as the cable 12 are embedded in the plastic disc 7'. In the area where the cable 12 emerges from the plastic disc 7' the cable 12 is enclosed by a covering 15, which is made of a material that has a greater viscosity than the plastic material 13 of the plastic disc 7'. The covering 15 forms the strain relief for the cable 12. This is above all required if the plastic disc 7' is made of a thermosetting plastic. The protection against electromagnetic interference fields is formed by the at least one insert part 16 which has a shielding effect.

Another embodiment of a plastic disc 7'' is illustrated in the section of FIG. 4c. In this case, too, merely the differences over the above-described examples will be explained. Again, the printed circuit board 11 with the sensor 10 mounted thereon and the sensor electronics of the rotary encoder are embedded in the plastic disc 7''. A plug 18 for cable 12 is provided on the printed circuit board 11, by means of which the signals of the sensor 10 are transmitted to a controller and the power supply is ensured. The plug 18 is injection-molded into the plastic disc 7''. It may also be provided that only the plug pins are injected. The strain relief for the cable 12 is accomplished by the plug casing of plug 18 or by the cable insulation of cable 12, respectively. In the area of the sensor 10 a recess is provided at the bottom side of the plastic disc 7''', i.e. at the side assigned to the solid measure 6, which recess has at least the size of the sensor 10. The protection against electric and magnetic interference fields is achieved by electrically conductive fillers 17 contained in the plastic molding compound 13 of the plastic disc 7'''.

Yet another embodiment of the plastic disc is shown in FIG. 4d. The plastic disc 7''' differs from the above-described plastic disc in that the connection cable 12 projects out of the cylindrical plastic disc 7''' upwardly at an angle. Preferably, the angle of projection of the connection cable 12 is approximately 45°. This embodiment allows an axial or radial cable outlet. In FIG. 4d the different cable outlets are marked by continuous and broken lines.

FIG. 4e, too, shows another embodiment of the plastic disc. The plastic disc 7'''' is formed such that the printed circuit board 11 is mounted on the bottom of the plastic disc 7''''. That is, the printed circuit board 11 is coated on one side only. The sensor 10 is therefore mounted on the upper side of the printed circuit board 11. Moreover, the electrical connection point on the printed circuit board 11 is not coated. In the area where the connection cable 12 encounters the printed circuit board, i.e. in the area in which the connecting plug is mounted on the printed circuit board 11, a recess is therefore provided. This can be clearly seen in the top view onto the plastic disc 7'''' shown in FIG. 4f.

Also, various combinations of these embodiments are possible. For instance, the recess may in all embodiments be provided in front of the sensor. Alternatively, the sensor could be disposed on the upper side of the printed circuit board. Also, it would be possible for a plastic disc to comprise several protection means against electromagnetic interference fields, i.e. a lacquer coat and/or insert parts and/or electrically conductive fillers.

A method for producing the plastic disc 7 with the printed circuit board 11 including sensor 10 and the sensor electronics of the rotary encoder embedded in the plastic disc 7 shall now be explained by means of FIGS. 5a and 5b.

Initially, the printed circuit board 11 with the sensor 10 mounted thereon is introduced into an injection mold. The printed circuit board 11 with the sensor 10 mounted thereon is positioned in the injection mold such that the position of the sensor 10 in the plastic disc 7 is defined with respect to the outer dimensions of the plastic disc 7.

In order to facilitate the positioning of the printed circuit board 11 in the injection mold it may be provided that pins are provided in the injection mold and that the printed circuit board is provided with bores into which the pins engage, thereby defining the position of the printed circuit board in the injection mold, and thus the position of the sensor in the plastic disc.

As is illustrated in FIGS. 5a and 5b, it may be provided alternatively that the injection mold comprises a die 19, which includes a receptacle or cavity 28 for the casing of the sensor 10. In this case, the sensor 10, and thus the printed circuit board 11, is aligned in the injection mold by the cavity 28 in the die 19. The radial position of the cavity 28 in the die 19 corresponds to the radial position of the solid measure 6 on the electric motor 2, so that the positions of the sensor 10 and the solid measure 6 are adapted to each other.

Another possibility of positioning the printed circuit board in the injection mold can be accomplished by providing the printed circuit board with a lead frame, which is fixed in the injection mold, thereby positioning the sensor in the injection mold.

Another possibility is to coat a part of the plastic disc in advance, to place the printed circuit board with the sensor on the pre-coated element of the plastic disc and to completely encapsulate it with the plastic material subsequently.

The injection mold comprises an outer wall, which defines the outer contour of the plastic disc 7. If the sensor-side fixing member 8 is formed by a separate sleeve it may be provided that the outer wall of the injection mold is formed by this sleeve. In this case, the plastic material is injected into the sleeve, so that the plastic disc 7 is formed in the sleeve and is thus directly joined to the sleeve. The sleeve has then the shape of a pot, with the plastic disc 7 forming the bottom of the pot. The printed circuit board 11 with the sensor 10 is aligned in the injection mold according to one of the above-described possibilities, so that the printed circuit board 11 with the sensor 10 mounted thereon adopts a predetermined position in the plastic disc 7. Therefore, the position of the sensor 10 is dimensionally stable with respect to the outer contour of the plastic disc 7.

If the printed circuit board 11 with sensor 10 is positioned according to one of the above-described possibilities, a lid 20 of the injection mold is placed upon the sleeve or the edge of the injection mold. This lid 20 includes an opening 21 through which the liquid plastic material 13 is filled into the injection mold. The injection molding or cast around process is configured to prevent a damage to the sensor electronics, sensor 10 and printed circuit board 11 with the cable 12 fixed thereto. Preferably, low-pressure processes with thermosetting plastics, thermoplastic injection molding, two-component casting resins or partially polymerized single-component resins are used. In order to obtain the protection against electric and magnetic interference fields the plastic material 13 may be provided with electrically conductive fillers. Also, it is possible to introduce insert parts having a shielding effect into the plastic disc, or coat the plastic disc at least partially with an electrically conductive lacquer coat.

As the outer contour of the plastic disc 7 is standardized with respect to the interface with the electric motor 2 and the sensor 10 is aligned with respect to the outer contour of the plastic disc 7 the desired radial alignment of the sensor 10 is obtained, so that an optimum interaction between the solid measure 6, which is mounted on the motor shaft 5 of the electric motor 2, and the sensor is obtained.

Moreover, programming pins on the printed circuit board 11 can be exempted during the injection molding, which are filled or pressed together by a hot die after the programming.

When the kit 1 is assembled, the plastic disc has to be fixed by the sensor-side fixing member to the motor-side fixing member. As both fixing members are formed complementarily with respect to each other, and as preferably one of the fixing members is formed as a shaft and the other fixing member is formed as a bore, the two fixing members merely have to be inserted into each other in order to fix the plastic disc to the electric motor.

As was described before, the position of the sensor 10 has been defined in the injection molding process with respect to the outer dimensions of the plastic disc 7 and thus with respect to the sensor-side fixing member. By this, the radial position of the sensor 10 is determined with respect to the radial position of the solid measure 6, which is mounted on the motor shaft 5. The sensor-side fixing member and the motor-side fixing member can be realized such that they also define the axial distance between the sensor 10 and the solid measure 6. This is above all the case if the sensor-side fixing member is fixedly connected to the plastic disc 7.

If the sensor-side fixing member is formed as a separate sleeve, or if the sensor side fixing member is formed by the circumferential surface of the plastic disc 7, the axial distance between the sensor 10 and the solid measure 6 has to be adjusted. This is shown in FIGS. 6a to 6c. The plastic disc 7 is pushed into the sleeve 8 (FIG. 6a) and introduced into the sleeve 8 until the bottom side 22 of the plastic disc 7 lies on the solid measure 6 (FIG. 6b). Then, the plastic disc is pulled out again to size, so that the optimum distance between the bottom side 22 of the plastic disc 7 and the solid measure 6 and, thus, the optimum distance between the sensor 10 and the solid measure 6 is adjusted (FIG. 6c).

FIG. 7 shows another embodiment of an electric motor 2.1. Separate protection is claimed for this embodiment. The electric motor 2.1 comprises a casing 3.1 in which a stator 33 and a rotor 34 disposed on a motor shaft 5.1 are mounted. In an end wall 35 on a front side of the casing 3.1 a first bearing seat 36 for the motor shaft 5.1 is formed. In the area of the end wall 4.1 on a rear side of the electric motor 2.1 an insertion hole is provided for the plastic disc 7.1 with the sensor 10.1 embedded therein. The plastic disc 7.1 is substantially formed in accordance with the embodiments described above. Below, merely the differences will be explained.

The plastic disc 7.1 is substantially cylindrical, with the circumferential surface of the plastic disc 7.1 forming the sensor-side fixing member 8.1. The plastic disc 7.1. is introduced through the insertion hole into the casing 3.1 of the electric motor 2.1. The inner wall of the casing 3.1 forms the motor-side fixing member 9.1. In order to achieve a fixed connection it may be provided that the plastic disc 7.1 is glued, welded to or calked with the motor casing 3.1. A printed circuit board 11.1 with the sensor 10.1 mounted thereon are embedded in the plastic disc 7.1. The printed circuit board 11.1 is connected to a power supply unit by the connection cable 12.1. Contacts for the electronic commutation of the stator may be provided on the plastic disc 7.1. The plastic disc 7.1 further comprises a central bore 37 through which the motor shaft 5.1 is passed. One portion of the bore 37 in the plastic disc 7.1 is formed to provide a second bearing seat 29 for the motor shaft 5.1. Ball bearings preferably serve as bearings 30, 31, which are inserted into the first bearing seat 36 in the casing 3.1 of the electric motor 2.1 and into the second bearing seat 29 of the plastic disc 7.1. At the rear end of the motor shaft 5.1 the solid measure 6.1 is mounted, which may likewise be pushed onto the motor shaft 5.1 through the insertion hole of the motor casing 3.1. This means that the plastic disc 7.1 is disposed on the motor shaft between the rotor 34 and the solid measure 6.1. The insertion hole is covered by a cap 32.

Most different variants may be used as rotary encoders. For instance, capacitive rotary encoders, inductive rotary encoders, magnetoresistive rotary encoders, optical rotary encoders or potentiometric rotary encoders may be used. Due to the standardized mechanical interface between the plastic disc and the electric motor it is no longer necessary to construct a modified rotary encoder casing for each new type of rotary encoder or for each new type of electric motor. Possibly changed cable variants on the rotary encoder can be dealt with by different injection mold inserts. There is no need to construct a new casing.

The invention claimed is:

1. Kit for an electric motor having a rotary encoder for determining the position of a motor shaft of the electric motor, comprising:
    an electric motor and;
    a rotary encoder having a solid measure and having a sensor with a sensor electronics, wherein the solid measure of the rotary encoder can be mounted on a motor shaft emerging from the electric motor at a rear end face of the electric motor, the sensor and the associated sensor electronics of the rotary encoder being at least partially coated with a plastic material so as to form a plastic disc; and
    a motor-side fixing member disposed at the rear end face of the electric motor wherein the plastic disc comprises a sensor-side fixing member designed to be complementary with the motor-side fixing member.

2. Kit according to claim 1, wherein one of the two fixing members is sleeve-shaped and the other fixing member has a complementary shape, so that the fixing members can be inserted into each other.

3. Kit according to claim 2, wherein the sleeve-shaped fixing member forms a cylindrical receptacle for the other fixing member (9; 96'''; 8'; 8''; 8.1) which is formed as a cylindrical shaft.

4. Kit according to claim 1, wherein the motor-side fixing member is formed as a cylindrical bore or as a cylindrical shaft on the motor casing and the plastic disc with the sensor embedded therein is cylindrical and at least partially formed as a sensor-side fixing member with a cylindrical shaft or with a cylindrical bore.

5. Kit according to claim 1, wherein the sensor-side fixing member is formed as a sleeve mounted on the plastic disc.

6. Kit according to claim 5, wherein the plastic disc with the sensor and the sensor electronics embedded therein is displaceable in the sleeve in order to adjust an optimum distance between the solid measure and the sensor.

7. Kit according to claim 1, wherein the plastic disc is provided with a protection against electromagnetic interference fields.

8. Kit according to claim 7, wherein the protection against electromagnetic interference fields is realized by an electrically highly conductive lacquer coat applied to the plastic disc and/or electrically conductive fillers incorporated in the plastic disc and/or insert parts having a shielding effect mounted on the plastic disc.

9. Kit according to claim 1, wherein the sensor electronics is connected to a cable and a strain relief for the cable is provided in the plastic disc.

10. Kit according to claim 1, wherein the sensor and the associated sensor electronics is mounted on a printed circuit board and the printed circuit board comprises electrical connectors for the electric motor.

11. Kit according to claim 10, wherein electrical contact elements are disposed on the printed circuit board or on the motor winding, which form the electrical connectors for the electric motor.

12. Kit according to claim 1, wherein the plastic disc is inserted into the casing of the electric motor in the area of the rear end face, wherein the casing forms the motor-side fixing member and the plastic disc forms the sensor-side fixing member.

13. Kit according to claim 12, wherein the plastic disc forms a bearing seat for the motor shaft of the electric motor.

14. Kit according to claim 12, wherein the plastic disc with the sensor embedded therein and the associated sensor electronics is disposed between the rotor and the solid measure on the motor shaft.

15. Electric motor formed of a kit comprising:
    a rotary encoder having a sensor with an associated sensor electronics embedded in a plastic disc and having a solid measure, wherein the plastic disc is inserted into a casing of the electric motor and forms a bearing seat for a motor shaft of the electric motor.

16. Method for producing a plastic disc with a sensor including an associated sensor electronics of a rotary encoder embedded therein and disposed on a printed circuit board for an electric motor kit by injection molding, the method comprising:

introducing the printed circuit board with the sensor and the sensor electronics into an injection mold; and coating the printed circuit board and the sensor with a plastic material, wherein the printed circuit board with the sensor mounted thereon is positioned in the injection mold such that a position of the sensor in the plastic disc is defined with respect to outer dimensions of the plastic disc.

17. Method according to claim 16, wherein pins are provided in the injection mold which engage in bores in the printed circuit board, thereby defining the position of the sensor in the plastic disc.

18. Method according to claim 16, wherein a cavity is provided in the injection mold, into which the sensor is placed and thus positioned.

19. Method according to claim 16, wherein the printed circuit board is fixed in the injection mold by a lead frame, thereby positioning the sensor.

20. Method according to claim 16, wherein the printed circuit board with the sensor is placed onto a pre-coated element of the plastic disc and is completely encapsulated.

* * * * *

UNITED STATES PATENT AND TRADEMARK OFFICE
CERTIFICATE OF CORRECTION

PATENT NO.          : 8,561,306 B2                              Page 1 of 1
APPLICATION NO.     : 13/140246
DATED               : October 22, 2013
INVENTOR(S)         : Max Erick Busse-Grawitz et al.

It is certified that error appears in the above-identified patent and that said Letters Patent is hereby corrected as shown below:

In the Claims

Column 12, line 14, please delete "(9; 96'"; 8'; 8"; 8.1)"

Signed and Sealed this
Eighteenth Day of February, 2014

Michelle K. Lee
*Deputy Director of the United States Patent and Trademark Office*